May 19, 1925.  1,538,686
W. T. CHAMBERLAIN
AIR PREHEATER
Filed May 31, 1924  6 Sheets-Sheet 2
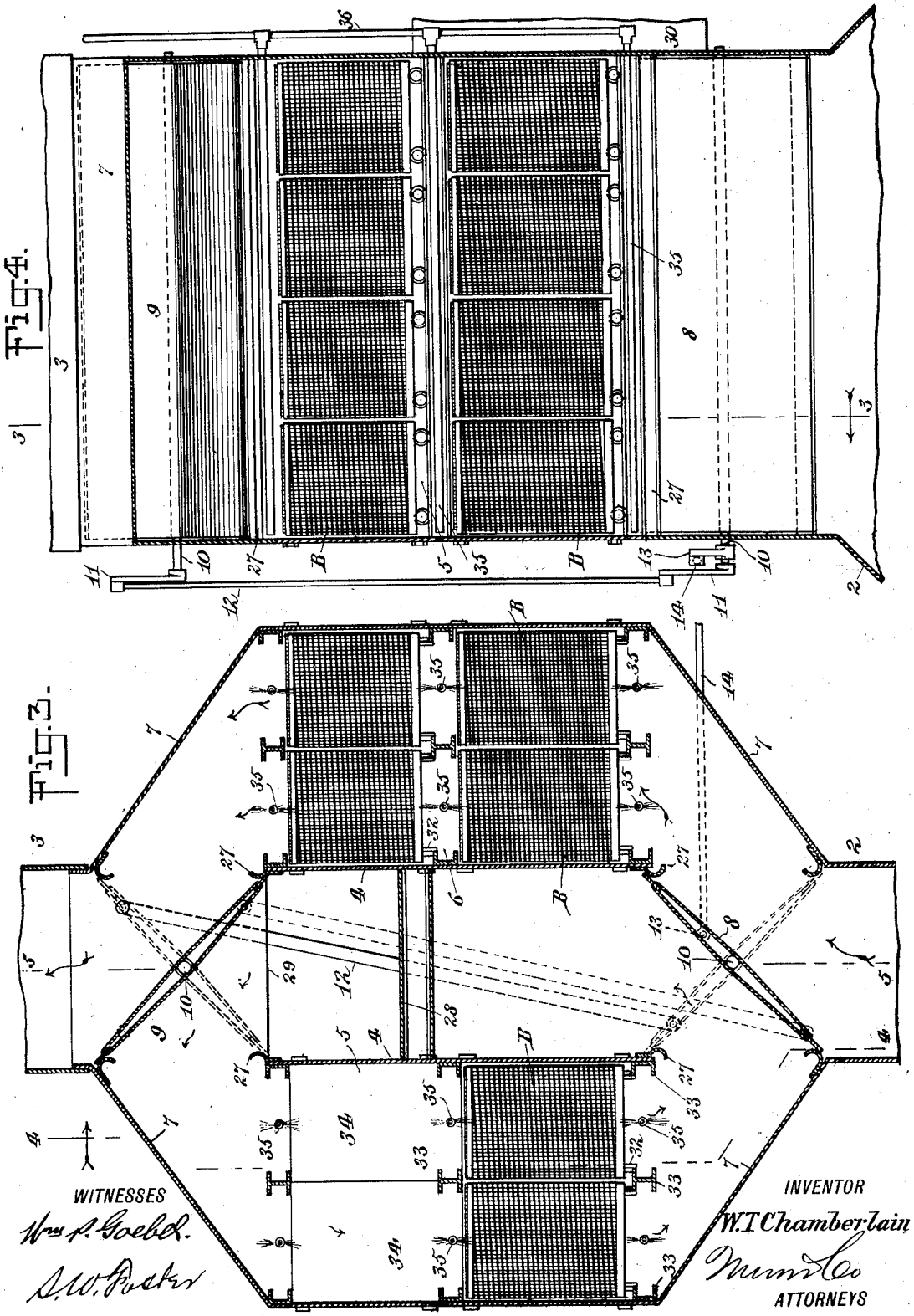

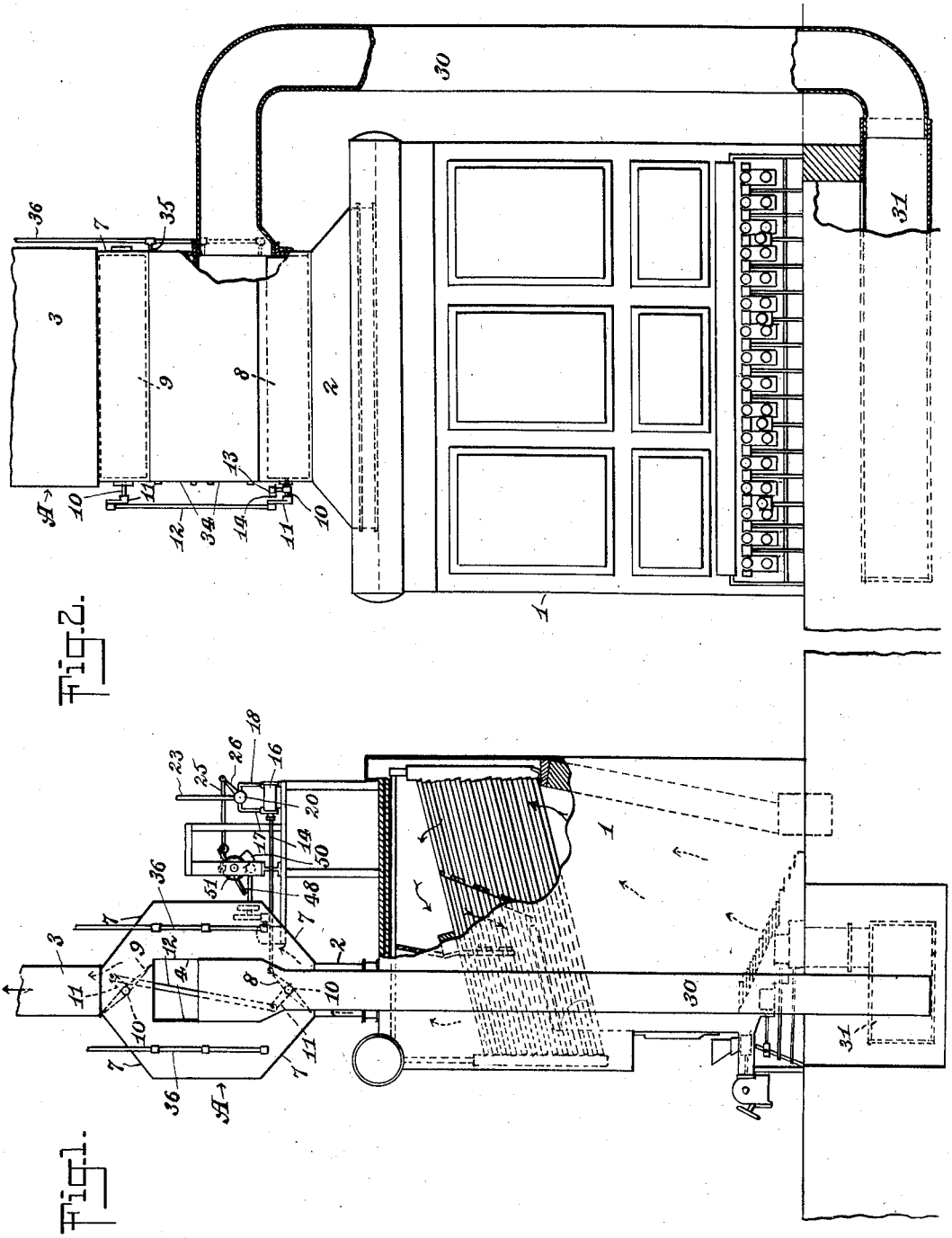

May 19, 1925.
W. T. CHAMBERLAIN
AIR PREHEATER
Filed May 31, 1924
1,538,686
6 Sheets-Sheet 3
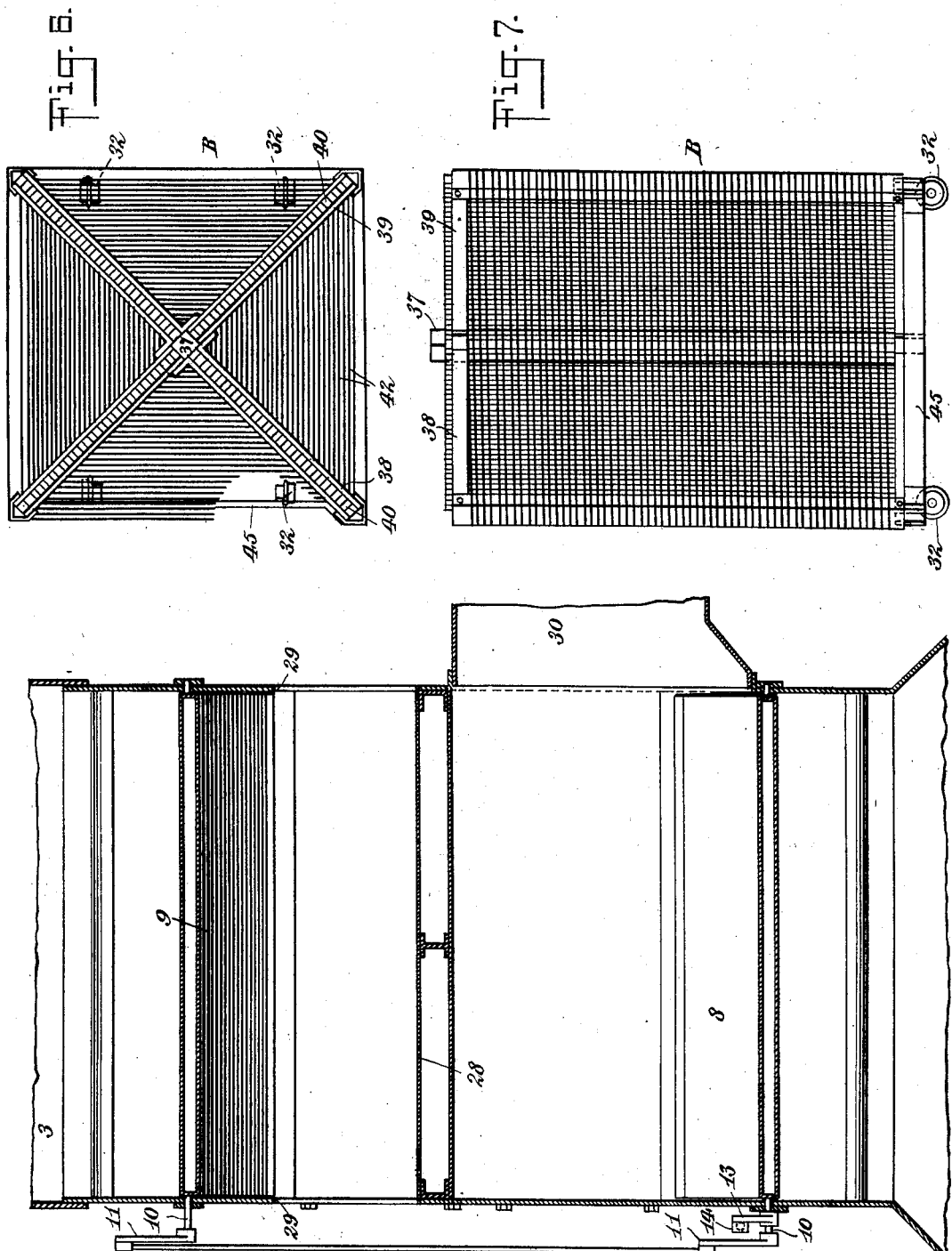

May 19, 1925. 1,538,686
W. T. CHAMBERLAIN
AIR PREHEATER
Filed May 31, 1924 6 Sheets-Sheet 4
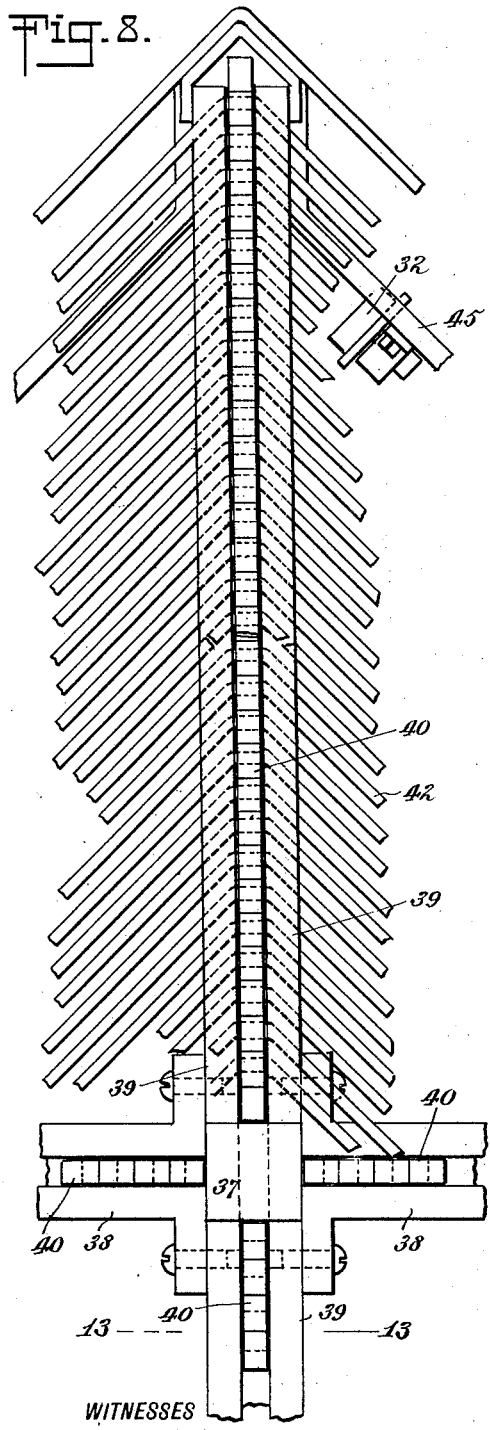
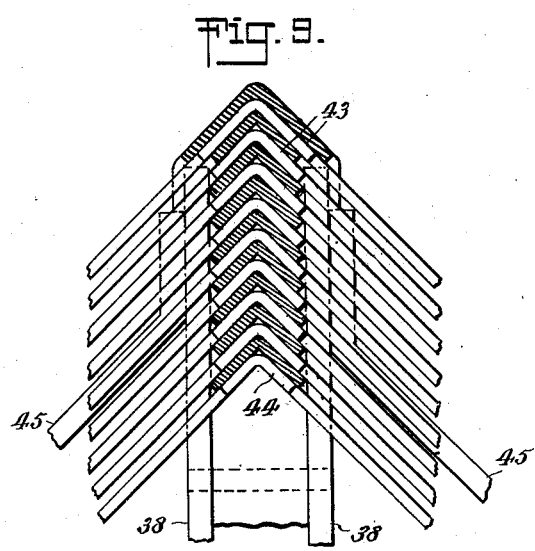
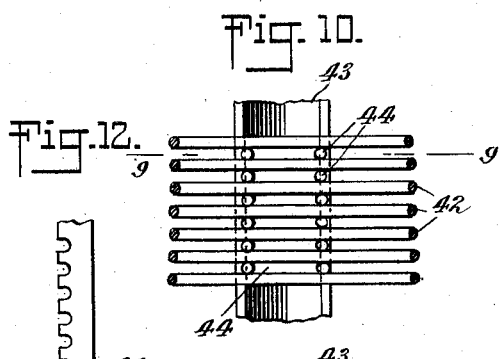
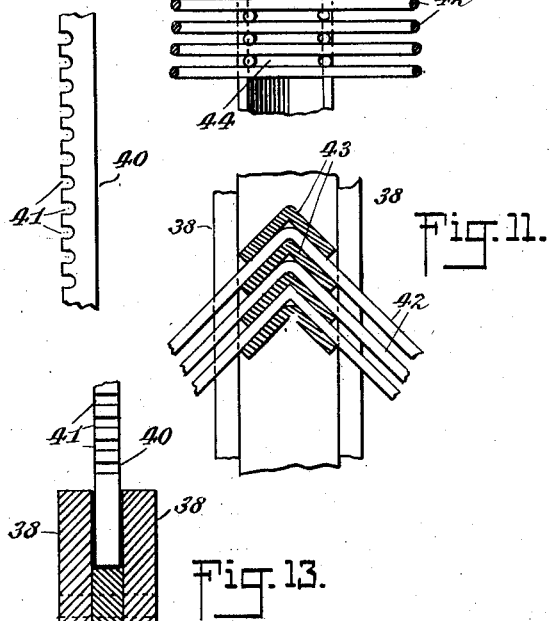
INVENTOR
W. T. Chamberlain
BY
ATTORNEYS May 19, 1925. 1,538,686
W. T. CHAMBERLAIN
AIR PREHEATER
Filed May 31, 1924 6 Sheets-Sheet 5
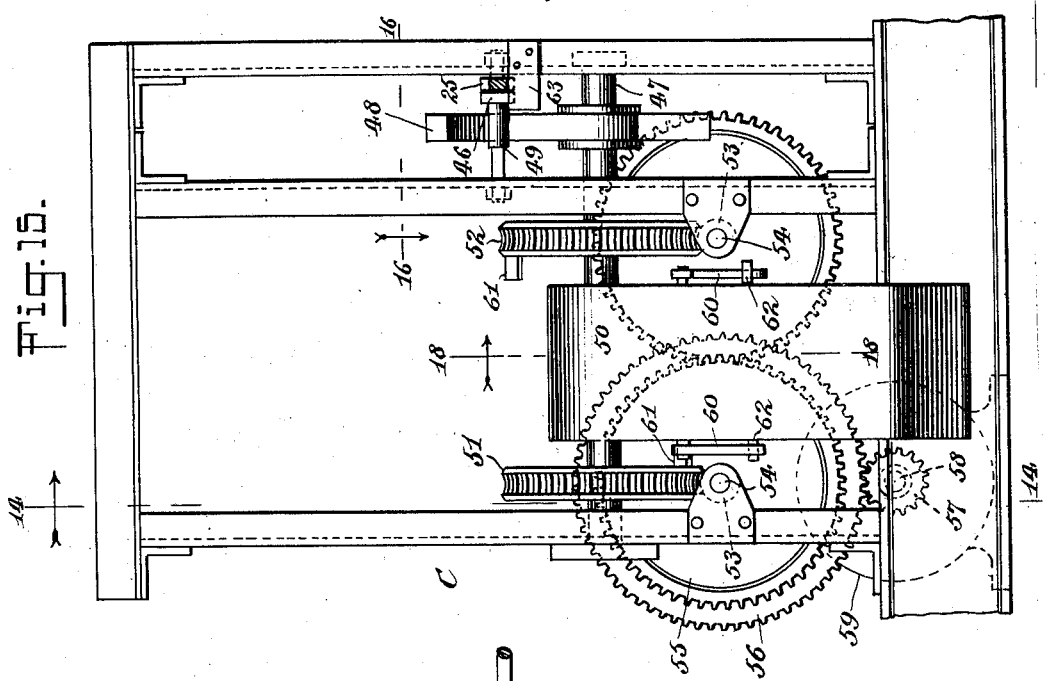
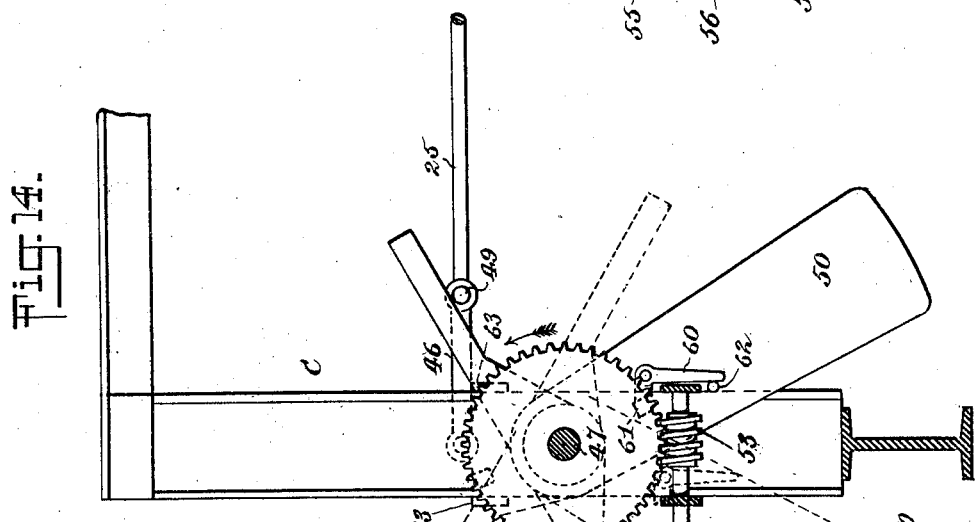
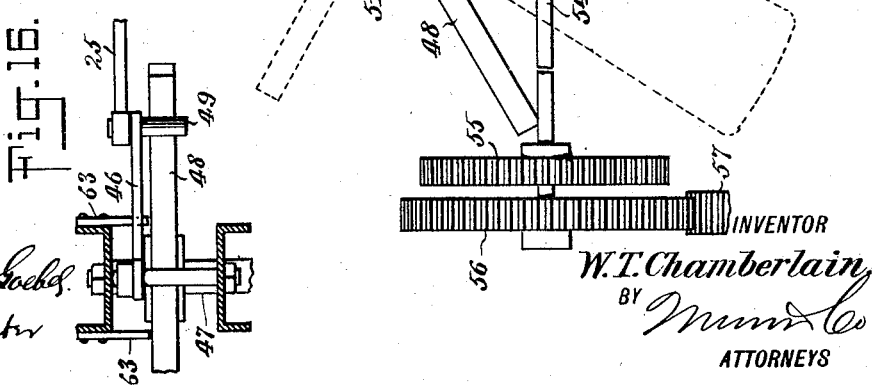
WITNESSES
INVENTOR
W. T. Chamberlain
BY
ATTORNEYS

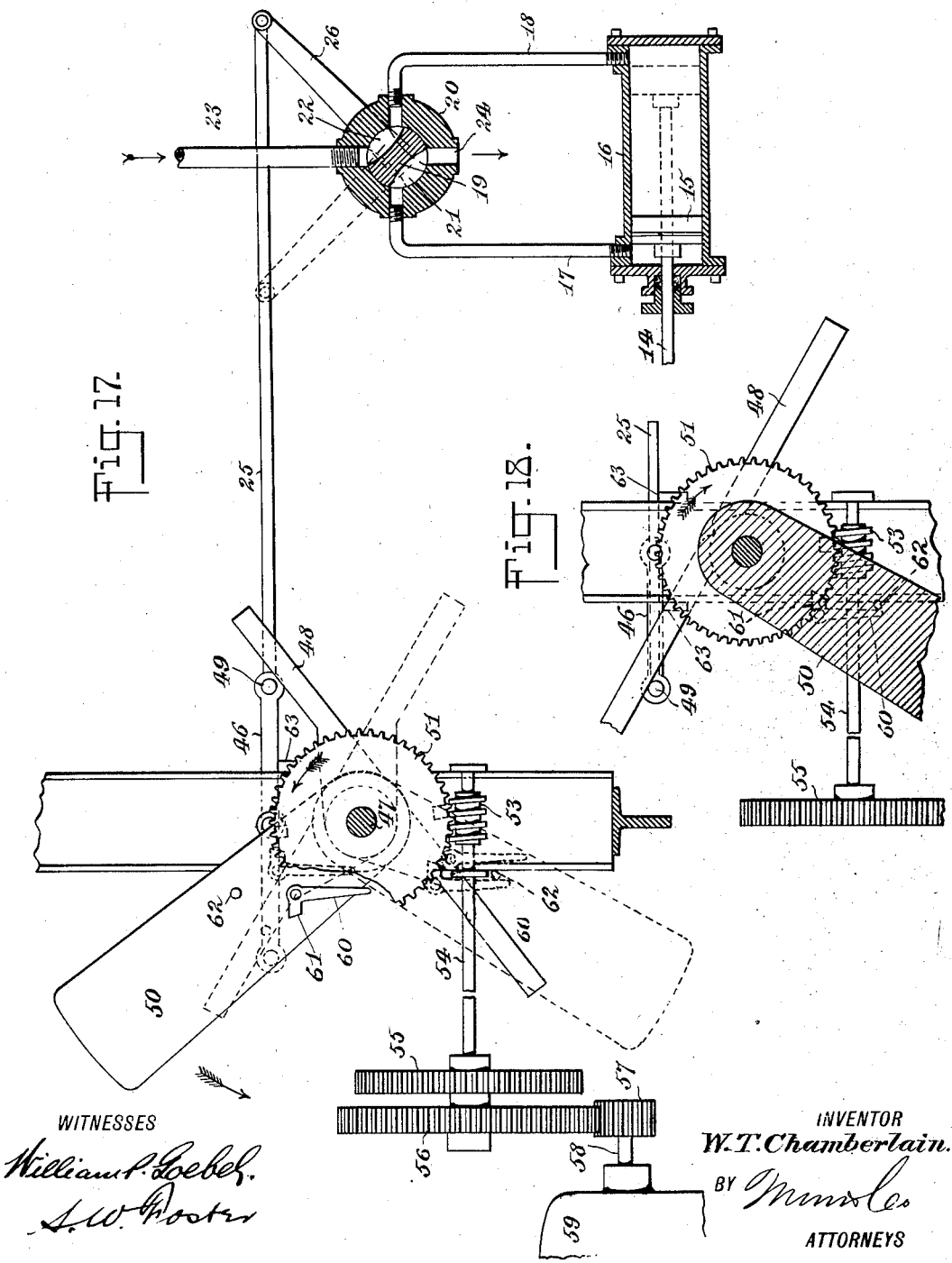

Patented May 19, 1925.

1,538,686

UNITED STATES PATENT OFFICE.

WILLIAM T. CHAMBERLAIN, OF NEW YORK, N. Y.

AIR PREHEATER.

Application filed May 31, 1924. Serial No. 717,077.

*To all whom it may concern:*

Be it known that I, WILLIAM T. CHAMBERLAIN, a citizen of the United States, and a resident of the city of New York, borough of Manhattan, in the county and State of New York, have invented a new and Improved Air Preheater, of which the following is a full, clear, and exact description.

This invention relates to air preheaters and more particularly to improved apparatus adapted for use in connection with any type of stove or furnace and which functions to utilize the smoke and gases from the furnace or stove to heat elements, and the latter function to preheat air entering the furnace.

A further object is to provide an improved construction and arrangement of parts whereby the direction of flow of the smoke and gases and the air are reversed at suitable intervals whereby the air heating elements are alternately subjected to the heat from the smoke and gases and then radiate such heat into the air entering the stove or furnace.

A further object is to provide an improved arrangement of chambers and passages with improved heating elements therein and an improved arrangement of valves which control the flow of the smoke and gases and the air.

A further object is to provide an improved construction of heating elements and improved mounting therefor.

A further object is to provide an improved means for automatically shifting the valves which permit the valves to remain in one position for a predetermined length of time and then quickly and suddenly shift the position of the valves to change the direction of flow of the smoke and gases and the air.

With these and other objects in view, the invention consists in certain novel features of construction and combinations and arrangements of parts which will be more fully hereinafter described and pointed out in the claims.

In the accompanying drawings—

Figure 1 is a view in elevation, partly broken away, illustrating my improvement in connection with a furnace of the boiler type;

Figure 2 is a view in front elevation at right angles to Figure 1, portions of the apparatus being in section;

Figure 3 is a view on an enlarged scale showing my improved construction and arrangement of preheater with certain of the heating elements removed, the view being taken in section on the line 3—3 of Figure 4;

Figure 4 is a view in section on the line 4—4 of Figure 3;

Figure 5 is a view in section on the line 5—5 of Figure 3;

Figure 6 is a top plan view of one of the heating elements;

Figure 7 is a view in front elevation of the heating element shown in Figure 6;

Figure 8 is an enlarged fragmentary view, in detail, of the construction of the improved heating element shown in Figures 6 and 7;

Figures 9, 10 and 11 are detail views illustrating a modification of the construction of the heating element;

Figures 12 and 13 are detail views of parts shown in Figure 8;

Figure 14 is a view illustrating my improved valve-throwing mechanism, the view being taken in section on the line 14—14 of Figure 15;

Figure 15 is a view in elevation at right angles to Figure 14, showing the arrangement of parts constituting my improved valve-throwing mechanism;

Figure 16 is a fragmentary view in section on the line 16—16 of Figure 15;

Figure 17 is a sectional view illustrating the assemblage of my improved valve-throwing mechanism in connection with the valve and its co-operating parts;

Figure 18 is a fragmentary view in section on the line 18—18 of Figure 15.

General assemblage.

1 represents a stove or furnace, which may be of the boiler type shown or may be of any other type. This furnace has a smoke outlet flue 2 which communicates with one end, preferably the lower end, of my improved air preheater A, the latter having a smoke outlet flue 3 at one end.

This air preheater A has a pair of parallel partitions 4, 4 in its central portion, dividing the same into two passages 5 and 6, both of which communicate at their respective ends with the flues 2 and 3, the end walls of the preheater casing being tapered or inclined, as shown at 7, and a pair of butterfly valves 8 and 9 are located in the respective ends of the preheater casing to control the flow of smoke and gases and air, as will more fully hereinafter appear.

These valves 8 and 9 are fixed to shafts 10 which project through the preheater casing and have crank arms 11 thereon connected by a link 12 so that they are compelled to move in unison. A second crank arm 13 is fixed to one of the shafts 10 and an operating rod 14 is connected to said arm and to a piston 15, the latter movable in the cylinder 16 and caused to move longitudinally in the cylinder 15 by a fluid, such as air or steam, admitted through pipes 17 and 18 communicating with respective ends of the cylinder 16 and controlled by a valve 19 located in a casing 20.

This valve 19 is preferably of the plug or turning type having two passages 21 and 22 so that when the valve is in the position shown in Figure 17 a fluid supply pipe 23 is in communication with the pipe 18, and the pipe 17 is in communication with an outlet 24. When the valve is turned so as to reverse its position, fluid is admitted through the pipe 17 to move the piston 15 to the right of Figure 17, and the fluid in the cylinder exhausts through the outlet 24.

As it is desirable that this valve 19 operates quickly because it controls the position of the valves 8 and 9, I have devised an improved valve-throwing mechanism which will be more fully hereinafter described and which functions to operate a rod 25 connected to a crank arm 26 fixed to the valve 19.

The valves 8 and 9 above referred to are preferably hollow but may be otherwise formed and constructed so as to withstand the temperature to which they are necessarily subjected, and to provide for the necessary expansion and contraction and, furthermore, to insure a proper seating of these valves I provide resilient valve seats 27 against which the ends of the valves 8 and 9 engage so that a certain cushioning effect is had and also a certain movement or flexing is permitted to dislodge any soot or dirt which might accumulate and prevent proper closing of the valves.

*Preheater construction.*

Referring more particularly to Figures 3 to 13, inclusive, it will be noted that a partition 28 extends from the inner partition walls 4, 4 and that the space between said partitions 4, 4 at their upper edge is open so that air is permitted to enter this opening, indicated by the reference numeral 29, and flow downwardly through either of the passages or chambers 5 and 6 in accordance with the positions of the valves 8 and 9.

We will assume for purposes of description that the valves 8 and 9 are in the position shown in full lines in Figure 3 when it will be noted that the air entering the opening 29 will flow downwardly through the passage or chamber 5 into the space between the partitions 4, 4 below partition 28, from which point the air is conveyed by a flue 30 to an outlet box 31 located at any suitable position in the stove or furnace but preferably under the grate 31' as shown in Figures 1 and 2. The smoke and gases passing upwardly through the flue 2 flow through the right-hand chamber 6 and out through the flue 3.

When the position of the valves 8 and 9 are reversed, the flow of air and smoke and gases is likewise reversed, as will be readily understood.

Within the chambers or passages 5 and 6 I provide a plurality of independent heating elements B. These heating elements B are preferably provided at their lower ends with rollers 32 which ride upon tracks 33, and doors 34 are formed in the wall of the preheater casing so that these elements B can be moved into and out of the preheater by rolling them along the tracks, thus facilitating the assemblage and also the removal of the elements when it is desired to clean or replace the same.

Between the sets of elements B I may locate any number of steam or air discharge nozzles 35 which communicate with a supply pipe or supply pipes 36 so that steam or air may be injected at any suitable time to clean the heating elements.

*Heating element.*

It is of great importance to construct a heating element which will absorb the greatest possible amount of heat and likewise radiate such heat, and with this object in view I construct my improved heating elements largely of wire and shall describe in detail one of these heating elements which will apply, of course, to all alike.

In constructing a heating element I provide a central post 37 to which arms 38 and 39 are connected. These arms 38 and 39 in their assemblage constitute in effect channels in which spacers 40 are mounted. These spacers 40 may constitute strips, as shown in Figure 12, having notches 41 in one edge to receive the wire 42 and properly space the runs of said wire.

Instead of providing spacing strips 40 I may locate angles 43 between the runs of the wire, as shown in Figures 9, 10 and 11, and to space the wires laterally from each other I may provide short sections of wire 44 between the runs of wire and also between the angular spacers 43. In constructing the elements a single set of spacers is assembled as the wire indicated by the reference numeral 42 is wound thereon. In other words, the operation is to begin at the center and wind horizontally around and around, spacing the several runs as above indicated, until the winding reaches the desired length, when a set of spacers of proper form are assembled on top of the first winding and the winding begins again, but this time in the opposite direction so that with a single length of wire another element can be formed, and by providing this arrangement of spacers I construct a heating element which is composed mainly of wire with the different runs of wire spaced apart in both directions. Such a construction of heating element presents an enormous amount of radiating surface and also presents a construction which is not liable to be injured or disorganized by high temperatures, which absorbs the maximum of heat, and which causes or compels the air to filter therethrough and rapidly take up the heat so that the transfer of heat is rapid and of high temperature.

I do not wish to be limited, of course, to the exact construction and manner of forming and spacing the runs of wire but I do claim broadly the idea of a heating element of this type composed of a plurality of runs of wire spaced apart both longitudinally and transversely, vertically and horizontally. or in any two directions in which the winding and spacing takes place.

To provide a suitable mounting for the rollers 32 a base frame work 45 is provided at the lower end of each heating element.

Valve-throwing mechanism.

Referring more particularly to Figures 14 to 18, inclusive, C represents a supporting framework providing mounting for a crank arm 46 which is connected to the rod 25 of the valve crank arm 26 above referred to. This framework C also provides mounting for a shaft 47 on which a bar 48 is fixed between its ends, and the respective ends of this bar 48 are adapted to engage a crank pin 49 on the crank arm 46 to throw the valve as will be hereinafter explained.

A relatively heavy weighted arm 50 is also fixed to the shaft 47, and on said shaft 47 at opposite sides of the weighted arm 50 worm wheels 51 and 52 are loosely mounted. These worm wheels 51 and 52 are turned by worms 53 on shafts 54, and these shafts 54 have gear wheels 55 fixed thereon which under-mesh so as to compel the worm shaft 54 to turn in opposite directions and transmit motion in opposite directions to the worm wheels 51 and 52, respectively.

On one of the shafts 54 a large gear wheel 56 is fixed and is turned by a pinion 57 on a shaft 58 driven by a motor, preferably an electric motor, 59. The weighted arm 50 carries at opposite sides bell crank ratchet arms 60, these arms being reversely positioned at opposite sides with the shorter ends of the ratchet arms adapted to be engaged by lugs 61 on the worm wheels 51 or 52 and the longer ends of the arms engage fixed pins 62 on the weighted arm 50.

The operation of this valve-throwing mechanism is as follows: Assuming the parts to be in the position shown in Figure 14, it will be noted that the worm wheel 51 has its lug 61 in engagement with the bell crank ratchet arm 60 so that the longer end of said arm is held against the pin 62, and hence the weighted arm is being carried around by the worm wheel in the direction of the arrow.

This movement of the weighted arm causes the shaft 47 to turn and carry the bar 48 around with it. The crank arm 46 remains stationary until the left-hand end of the bar 48, shown in Figure 14, moves around far enough to engage the crank pin 49 on the arm 46. This position is shown in full lines in Figure 17. At this point the weighted arm 50 will fall in the direction of the arrow (see Figure 17) and the bar 48 will cause the crank arm 46 to swing rapidly over to the dotted line position of Figure 17 so that the valve 19 will be instantly shifted and the direction of flow of the fluid controlled by said valve will be reversed so that the piston 15 will be moved toward the opposite end of the cylinder 16 and the valves 8 and 9 of the preheater will be quickly reversed. The fall of the weighted arm 50 causes the ratchet arm 60 to move away from the lug 61, as will be readily understood. It is desirable to provide stop pins 63 on the framework C to limit the movement of the crank arm 46. After the weighted arm has moved to the dotted line position in Figure 17 it will be caused to move in the reverse direction and repeat the operation above described by action of the worm wheel 52 and its lug 61.

It will, of course, be noted that the ratchet arms 60 permit the lugs 61 to pass in one direction but compel the arm to move with the lug in the opposite direction.

It will, therefore, be noted that by the provision of the mechanism above described the apparatus is entirely automatic in so far as the shifting of the position of the valves 8 and 9 is concerned. Hence smoke and gases serve for a period to rapidly heat one set of elements B while the other elements are radiating heat into the incoming air. The valves are then shifted so that the flow is exactly reversed.

It will, of course, be noted that by reason of the construction such as above described, I require but two valves 8 and 9 to regulate the flow of smoke and gases and air, and that the construction is simplified over the prior art, improved as regards the heating elements and in its general arrangement and function.

Hence, while I have illustrated and described what I believe to be a preferred embodiment of my invention, I do not wish to be limited to the precise details set forth but consider myself at liberty to make such slight changes and alterations as fairly fall within the spirit and scope of the appended claims.

I claim:

1. An air preheater, comprising a casing having a pair of passages therein with inlet and outlet flues communicating with both passages, valves at the ends of the casing adapted to connect the flues with either passage, the said casing having an air inlet between the passages at one end of the casing and an air outlet between the passages at the other end of the casing, and heating elements in said passages.

2. An air preheater, comprising a casing having a pair of passages therein with inlet and outlet flues communicating with both passages, valves at the ends of the casing adapted to connect the flues with either passage, the said casing having an air inlet between the passages at one end of the casing and an air outlet between the passages at the other end of the casing, heating elements in said passages, and cushion valve seats against which the valves move in closing.

3. An air preheater, comprising a casing having a pair of passages therein with inlet and outlet flues communicating with both passages, valves at the ends of the casing adapted to connect the flues with either passage, said casing having an air inlet between the passages at one end of the casing and an air outlet between the passages at the other end of the casing, heating elements in said passages, means connecting the valves, and means for rapidly shifting the valves to change the directions of flow through the respective passages.

4. An air preheater comprising a pair of spaced flues connected at their ends, a partition between the spaced flues dividing said space into an inlet and an outlet passage communicating with the respective flues at their point of juncture, and valves controlling the passages through the flues.

WILLIAM T. CHAMBERLAIN.